United States Patent
Li

(10) Patent No.: US 9,647,552 B2
(45) Date of Patent: May 9, 2017

(54) CONSTANT ON TIME SWITCHING CONVERTER WITH DC CALIBRATION

(71) Applicant: Chengdu Monolithic Power Systems Co., Ltd., Chengdu (CN)

(72) Inventor: Yike Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 14/961,745

(22) Filed: Dec. 7, 2015

(65) Prior Publication Data

US 2016/0164416 A1 Jun. 9, 2016

(30) Foreign Application Priority Data

Dec. 8, 2014 (CN) .......................... 2014 1 0743088

(51) Int. Cl.
*H02M 3/158* (2006.01)
*H02M 1/00* (2006.01)

(52) U.S. Cl.
CPC .... *H02M 3/158* (2013.01); *H02M 2001/0025* (2013.01)

(58) Field of Classification Search
CPC ...................... H02M 3/158; H02M 2001/0025
See application file for complete search history.

(56) References Cited

U.S. PATENT DOCUMENTS

| 7,253,593 | B1 * | 8/2007 | Chen ..................... | H02M 3/158 323/224 |
| 7,764,057 | B2 * | 7/2010 | Groom ................... | H02M 3/156 323/283 |
| 8,970,194 | B2 | 3/2015 | Li | |
| 2004/0227497 | A1 * | 11/2004 | Asanuma ............... | G05F 1/575 323/283 |
| 2007/0120547 | A1 * | 5/2007 | Tateishi ................ | H02M 3/158 323/282 |
| 2008/0238396 | A1 * | 10/2008 | Ng .......................... | H03F 3/217 323/284 |
| 2011/0031948 | A1 * | 2/2011 | Chien ................. | H02M 3/1588 323/282 |
| 2015/0069982 | A1 | 3/2015 | Ouyang | |
| 2015/0244262 | A1 * | 8/2015 | Ouyang ................ | H02M 3/158 323/283 |
| 2015/0303902 | A1 * | 10/2015 | Steedman .............. | H03K 4/502 327/135 |

* cited by examiner

*Primary Examiner* — Jue Zhang
(74) *Attorney, Agent, or Firm* — Perkins Coie LLP

(57) ABSTRACT

A reference compensating circuit used in a COT control circuit. The reference compensating circuit has an error amplifier, a first current sink, a resistor, a second current sink, a current source and a capacitor. The error amplifier amplifies the difference between a reference signal and a feedback signal and generates an error signal. Based on the error signal, the first current sink generates a current flowing out from a node of the reference compensating circuit. The resistor receives the reference signal at one terminal. The other terminal of the resistor is coupled to the node. The second current sink sinks a current from the node intermittently. The current source sources a current into the node. The capacitor is coupled between the node and a ground to provide a calibrated compensation reference signal to the COT control circuit.

20 Claims, 3 Drawing Sheets

CONSTANT ON TIME SWITCHING CONVERTER WITH DC CALIBRATION

CROSS-REFERENCE TO RELATED APPLICATIONS

This application claims the benefit of CN application No. 201410743088.6, filed on Dec. 8, 2014, and incorporated herein by reference.

FIELD OF THE INVENTION

The present disclosure relates generally to electronic circuits, and more particularly but not exclusively to switching converters and control circuits for controlling the switching converters.

BACKGROUND OF THE INVENTION

Switching converters with constant on time (COT) control architecture are widely used in SMPS (switching mode power supply) due to the excellent load transient response performance. Compensation is ordinarily needed in a COT control circuit to stabilize an output voltage of a switching converter. However, the compensation signal for compensation usually comprises a DC (direct current) component which should be calibrated.

Thus, a COT switching converter with DC calibration and the associated control circuit are desired.

SUMMARY

Embodiments of the present invention are directed to a novel reference compensating circuit used in a COT control circuit. The reference compensating circuit generates a calibrated compensation reference signal at a compensation node. And based on the calibrated compensation reference signal, the COT control circuit controls a switching converter to convert an input voltage into an output voltage through turning a main switch and a freewheeling component on and off alternately. The reference compensating circuit has an error amplifier, a first current sink, a resistor, a second current sink, a first current source and a compensation capacitor. The error amplifier receives a reference signal and a feedback signal representative of the output voltage and generates an error signal based on the feedback signal and the reference signal. The first current sink is coupled to the compensation node. The first current sink receives the error signal and generates a first current based on the error signal. The first current flows out from the compensation node. The resistor has a first terminal coupled to the reference signal and a second terminal coupled to the compensation node. The second current sink is coupled to the compensation node to sink a second current from the compensation node when the main switch is turned on. The first current source is coupled to the compensation node to source a third current into the compensation node. The compensation capacitor is coupled between the compensation node and a ground.

Embodiments of the present invention are also directed to a novel COT control circuit. The COT control circuit controls a switching converter to convert an input voltage into an output voltage through turning a main switch and a freewheeling component on and off alternately. The control circuit has a reference compensating circuit, an on-time generation circuit, a comparison circuit and a logic circuit. The reference compensating circuit generates a calibrated compensation reference signal at a compensation node. The reference compensating circuit has an error amplifier, a first current sink, a resistor, a second current sink, a first current source and a compensation capacitor. The error amplifier receives a reference signal and a feedback signal representative of the output voltage and to generate an error signal based on the feedback signal and the reference signal. The first current sink is coupled to the compensation node. The first current sink receives the error signal and generates a first current based on the error signal. The first current flows out from the compensation node. The resistor has a first terminal coupled to the reference signal and a second terminal coupled to the compensation node. The second current sink is coupled to the compensation node to sink a second current from the compensation node when the main switch is turned on. The first current source is coupled to the compensation node to source a third current into the compensation node. The compensation capacitor is coupled between the compensation node and a ground. The on-time generation circuit generates an on-time signal. The comparison circuit compares the calibrated compensation reference signal with the feedback signal and generates a comparison signal. The logic circuit receives the on-time signal and the comparison signal and controls the main switch and the freewheeling component based on the on-time signal and the comparison signal.

Embodiments of the present invention are further directed to a novel switching converter having a switching circuit, an on-time generation circuit, a reference compensating circuit, a comparison circuit and a logic circuit. The switching circuit converts an input voltage into an output voltage by turning a main switch and a freewheeling component on and off alternately. The on-time generation circuit configured to generate an on-time signal. The reference compensating circuit generates a calibrated compensation reference signal at a compensation node. The reference compensating circuit has an error amplifier, a first current sink, a resistor, a second current sink, a first current source and a compensation capacitor. The error amplifier receives a reference signal and a feedback signal representative of the output voltage and generates an error signal based on the feedback signal and the reference signal. The first current sink is coupled to the compensation node. The first current sink receives the error signal and generates a first current based on the error signal. The first current flows out from the compensation node. The resistor has a first terminal coupled to the reference signal and a second terminal coupled to the compensation node. The second current sink is coupled to the compensation node to sink a second current from the compensation node when the main switch is turned on. The first current source is coupled to the compensation node to source a third current into the compensation node. The compensation capacitor is coupled between the compensation node and a ground. The comparison circuit compares the calibrated compensation reference signal with the feedback signal and generates a comparison signal. The logic circuit receives the on-time signal and the comparison signal and controls the main switch and the freewheeling component based on the on-time signal and the comparison signal.

DESCRIPTION OF THE DRAWINGS

The present invention can be further understood with reference to the following detailed description and the appended drawings, wherein like elements are provided with like reference numerals.

DESCRIPTION

Figure 1:
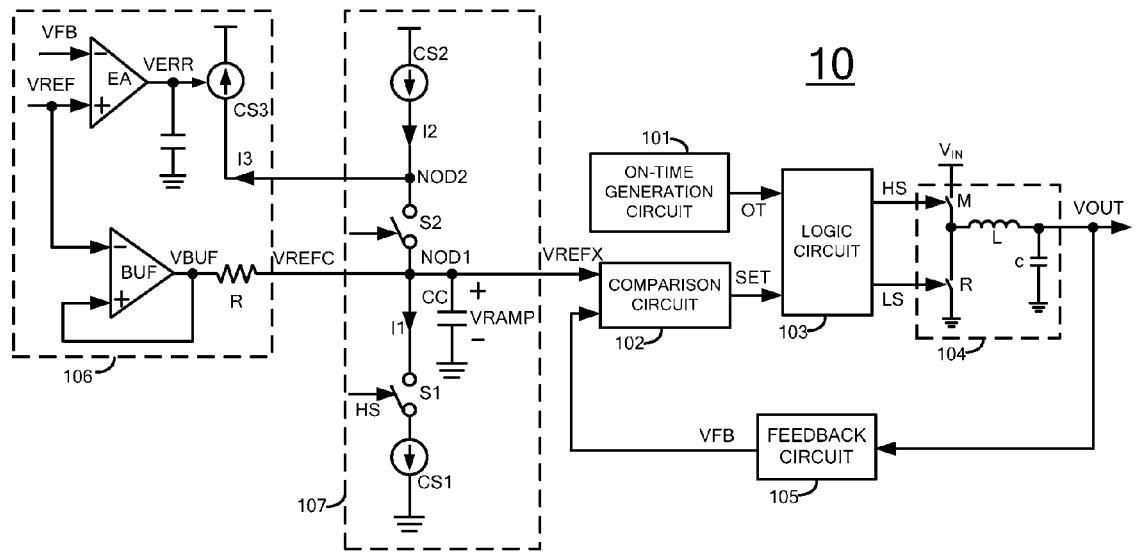
FIG. 1 illustrates a COT switching converter 10 in accordance with an embodiment of the present invention.

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or one embodiment combining software and hardware aspects. The following detailed description is, therefore, not to be taken in a limiting sense.

Throughout the specification, the meaning of "a," "an," and "the" may also include plural references.

As can be appreciated, the conductivity and doping of materials or regions disclosed herein may be varied, with appropriate changes to the conductivity and doping of other materials or regions, depending on the application.

FIG. 1 illustrates a COT switching converter 10 in accordance with an embodiment of the present invention. As shown in FIG. 1, the switching converter 10 is illustrated to comprise a control circuit, a switching circuit 104 and a feedback circuit 105. The switching circuit 104 is illustrated to be implemented with a synchronous buck topology which comprises a main switch M, a freewheeling component R, an output inductor L and an output capacitor C. The switching circuit 104 is configured to convert an input voltage VIN into an output voltage VOUT by switching the main switch M and the freewheeling component R on/off. The main switch M has a first terminal and a second terminal, and the main switch M is configured to receive the input voltage VIN at the first terminal. The freewheeling component R has a first terminal and a second terminal, wherein the first terminal of the freewheeling component R is coupled to the second terminal of the main switch M, and the second terminal of the freewheeling component R is coupled to a ground. The output inductor L has a first terminal and a second terminal, wherein the first terminal of the output inductor L is coupled to the common node of the main switch M and the freewheeling component R. The output capacitor C has a first terminal and a second terminal, wherein the first terminal of the output capacitor C is coupled to the second terminal of the output inductor L, and the second terminal of the output capacitor C is coupled to the ground. The voltage across the output capacitor C is provided as the output voltage VOUT.

Persons of ordinary skill in the art will recognize that the buck topology used for the switching circuit 104 in FIG. 1 is for illustration purpose. In another embodiment, the switching circuit 104 may be implemented with any other appropriate DC/DC or AC/DC converter topology, such as a boost converter, a buck-boost converter, a forward converter or a flyback converter etc., and in addition, the converter topology may be synchronous or asynchronous. In one embodiment where the switching circuit is implemented with a synchronous converter, the freewheeling component may comprise a transistor. Oppositely, in one embodiment where the switching circuit is implemented with an asynchronous converter, the freewheeling component may comprise a diode. It should also be known that any transistor comprised in the switching circuit 104 may be any type of semiconductor switching device, such as a Metal-Oxide-Semiconductor Field Effect Transistor (MOSFET) or an Insulated Gate Bipolar Transistor (IGBT) etc.

The feedback circuit 105 is coupled to the switching circuit 104, to receive the output voltage VOUT and to further generate a feedback signal VFB representative of the output voltage VOUT. Persons of ordinary skill in the art will recognize that, in another embodiment, the feedback circuit 105 may be omitted from the switching converter 10, and the output voltage VOUT may be used instead of the feedback signal VFB.

The control circuit is illustrated to comprise an on-time generation circuit 101, a comparison circuit 102, a logic circuit 103, an error calibration circuit 106 and a reference compensating circuit 107. The reference compensating circuit 107 is illustrated to comprise a current sink CS1, a first switch S1, a current source CS2, a second switch S2 and a compensation capacitor CC. The compensation capacitor CC has a first terminal and a second terminal, wherein the first terminal serves as an output terminal of the compensation circuit 107 and is referred to as compensation node NOD1, and the second terminal is coupled to the ground. The voltage across the compensation capacitor CC is provided as a slope compensation signal VRAMP of the reference compensating circuit 107. The first switch S1 and the current sink CS1 are coupled together in series and are then coupled between the compensation node NOD1 and the ground. The first switch S1 is controlled by a control signal HS which is provided to control the main switch M as well, as elaborated later, thus being turned on when the main switch M is on and being turned off when the main switch M is off. The current sink CS1 is configured to sink a first current I1 which is proportional to the input voltage VIN and flows out from the compensation node NOD1. The second switch S2 is coupled between the current source CS2 and the compensation node NOD1, and is turned off when the main switch M and the freewheeling component R are both off and turned on when either the main switch M or the freewheeling component R is on. The current source CS2 is configured to source a second current I2 which is proportional to the output voltage VOUT and flows into the compensation node NOD1.

Persons of ordinary skill in the art will recognize that, in one embodiment where the switching converter 10 keeps operating in continuous current mode (CCM), the second switch S2 may be omitted from the reference compensating circuit 107, and the second current I2 flows continuously into the compensation node NOD1. It should also be known that the reference compensating circuit 107 shown in FIG. 1 is contemplated by emulating a current flowing through the output inductor L. Of course, however, the reference compensating circuit may take any other appropriate form, such as a RC series circuit or the like.

The error calibration circuit 106 is illustrated to comprise an error amplifier EA, a current sink CS3 and a resistor R. The error amplifier EA has a first input terminal, a second input terminal and an output terminal, wherein the error amplifier EA is configured to receive a reference signal VREF at the first input terminal and the feedback signal VFB at the second input terminal, and to amplify the difference between the reference signal VREF and the feedback signal VFB and to further provide an error signal VERR at the output terminal. In the embodiment of FIG. 1, the error signal VERR is illustrated to be compensated by a compensation network comprising a capacitor, prior to being provided to the current sink CS3. However, it should be known that, in another embodiment, the error signal VERR may be used without compensation.

The current sink CS3 is coupled to the error amplifier EA to receive the error signal VERR and is configured to generate a current I3 based on the error signal VERR, wherein the current I3 flows out from the compensation node NOD1. In the embodiment shown in FIG. 1, an output terminal of the current sink CS3 is configured to be coupled to the common node NOD2 of the current source CS2 and the second switch S2, so as to selectively sink the current I3 through the control of the second switch S2. However, Persons of ordinary skill in the art will recognize that, in one embodiment where the second switch S2 is omitted from the reference compensating circuit, the current sink CS3 is configured to continuously sink the current I3 from the compensation node NOD1.

The resistor R has a second terminal coupled to the compensation node NOD1 and a first terminal, wherein the resistor R is configured to receive the reference signal VREF at the first terminal, and to provide a calibrated reference signal VREFC at the second terminal.

It should be noted that, in the embodiment of FIG. 1, the error calibration circuit 106 is shown to be separated from the reference compensating circuit 107, however, other embodiments are contemplated where the error calibration circuit 106 is a component of the reference compensating circuit 107.

In the embodiment of FIG. 1, the error calibration circuit 106 may further comprise a buffer circuit BUF. The buffer circuit BUF has a first input terminal, a second input terminal and an output terminal, wherein the second input terminal of the buffer circuit BUF is coupled to the output terminal of the buffer circuit BUF. The buffer circuit BUF is configured to receive the reference signal VREF at the first input terminal, and to further generate a buffer signal VBUF at the output terminal, wherein the buffer signal VBUF is provided to the first terminal of the resistor R. By this design, the buffer circuit BUF may be used to prevent the reference signal VREF from being interfered by the fluctuation of the buffer signal VBUF. Persons of ordinary skill in the art will recognize that the buffer circuit BUF in FIG. 1 is for illustration purpose and may be omitted from the error calibration circuit 106 in another embodiment, and accordingly, the first terminal of the resistor R is configured to receive the reference signal VREF instead of the buffer signal VBUF.

As shown in FIG. 1, when the second switch S2 is turned on, the current I3 flows from the first terminal of the resistor R to the second terminal of the resistor R, which in turn creates a voltage R*I3 across the resistor R, making the calibrated reference signal VREFC be: VREFC=VREF−R*I3. The calibrated reference signal VREFC is then superposed to the slope compensation signal VRAMP to form a calibrated compensation reference signal VREFX. Consequently, as the calibrated compensation reference signal VREFX comprises the DC component R*I3, the DC error introduced by the slope compensation signal VRAMP is eliminated.

The comparison circuit 102 has a first input terminal, a second input terminal and an output terminal, wherein the comparison circuit 102 is configured to respectively receive the calibrated compensation reference signal VREFX at the first input terminal and the feedback signal VFB at the second input terminal. By this design, the comparison circuit 102 compares the feedback signal VFB with the calibrated compensation reference signal VREFX, and thus generates a comparison signal SET at the output terminal. The on-time generation circuit 101 is configured to generate an on-time signal OT which is provided to control a duration when the main switch M is turned on, through the logic circuit 103. The logic circuit 103 has a first input terminal, a second input terminal and an output terminal, wherein the first input terminal is coupled to the on-time generation circuit 101 and the second input terminal is coupled to the output terminal of the comparison circuit 102. The logic circuit 103 is configured to respectively receive the on-time signal OT at the first input terminal and the comparison signal SET at the second input terminal, and based on the on-time signal OT and the comparison signal SET, the logic circuit 103 is configured to generate control signals HS and LS to respectively control the main switch M and the freewheeling component R.

Figure 2A:
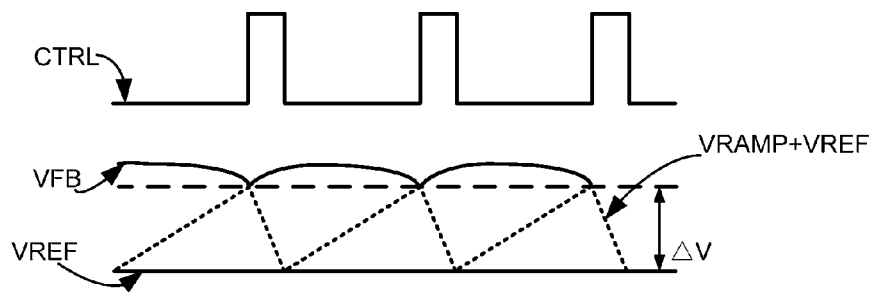
FIG. 2A illustrates waveforms of the switching converter 10 when no calibration is made.
Figure 2B:
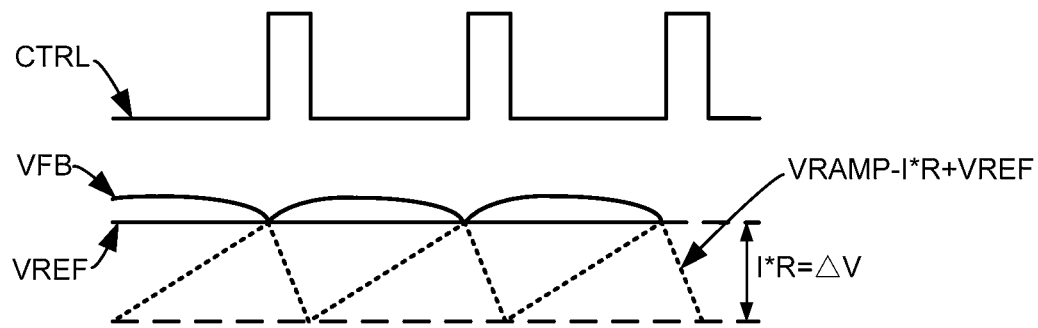
FIG. 2B illustrates waveforms of the switching converter 10 with calibration.

FIG. 2A illustrates waveforms of the switching converter 10 when no calibration is made. FIG. 2B illustrates waveforms of the switching converter 10 with calibration. As shown in FIG. 2A, without calibration, the feedback signal VFB is compared with the sum of the reference signal VREF and the slope compensation signal VRAMP, and consequently, the control signal CTRL turns the main switch M on to increase the output voltage VOUT when the feedback signal is lower than the sum. After a constant on time duration, the control signal CTRL turns off the main switch M to decrease the output voltage VOUT. As the feedback signal VFB is compared with the sum of the reference signal VREF and the slope compensation signal VRAMP, a DC component ΔV is introduced, causing the output voltage larger than a predetermined value. As illustrated in FIG. 2B, with calibration of the error calibration circuit 106, the current I3 flows from the first terminal of the resistor R to the second terminal of the resistor R, creating a voltage R*I3 across the resistor R. As a result, the feedback signal VFB is compared with the calibrated compensation reference signal VREFX, expressed as: VREFX=VREF+VRAMP−R*I3. The DC component R*I3 lowers the DC voltage at the compensation node NOD1, which helps to eliminate the DC component ΔV introduced by the slope compensation signal VRAMP.

Figure 3:
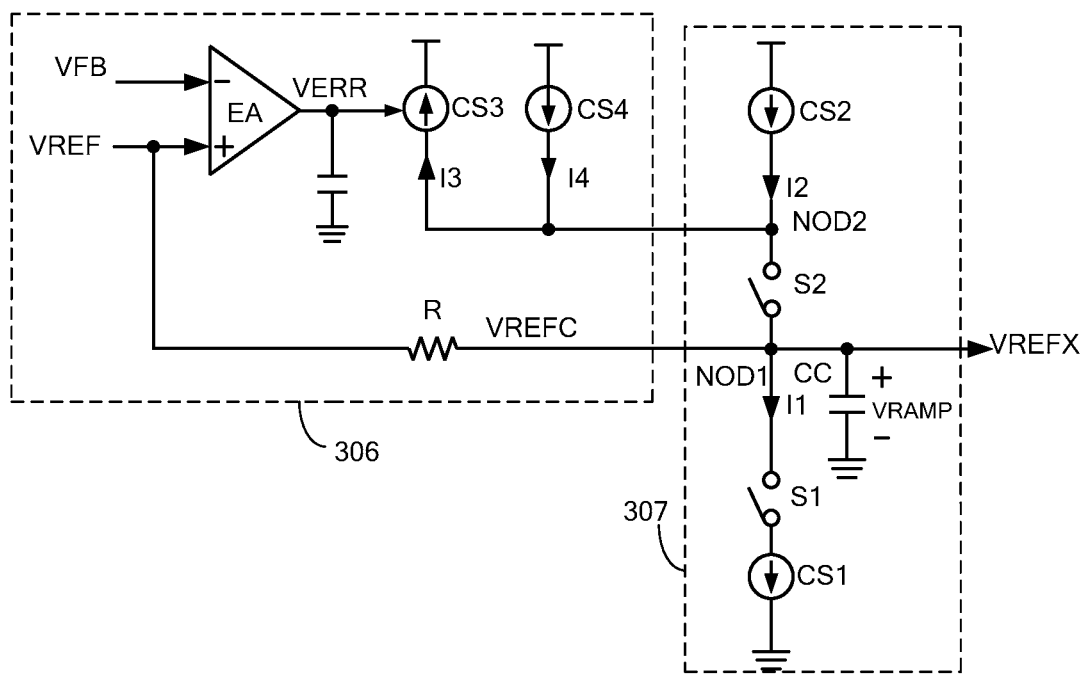
FIG. 3 illustrates an error calibration circuit 306 for eliminating the DC error introduced by the reference compensating circuit 307 in accordance with another embodiment of the present invention.

FIG. 3 illustrates an error calibration circuit 306 for eliminating the DC error introduced by the reference compensating circuit 307 in accordance with another embodiment of the present invention. Compared with the error calibration circuit 106 in FIG. 1, the error calibration circuit 306 in FIG. 3 further comprises a current source CS4 coupled to node NOD2, to source a fourth current I4 to the compensation node NOD1 when the second switch S2 is turned on. In one embodiment, the fourth current I4 may be constant, e.g., 1 uA, or vary with the output voltage VOUT. As the third current I3 flows out from the compensation node NOD1, while the fourth current I4 flows into the compensation node NOD1, the sum of the third current I3 and the fourth current I4 may flow from the first terminal of the resistor R to the second terminal of the resistor R, or reversely. As a result, either positive or negative DC error may be eliminated by the error calibration circuit 306.

Figure 4:
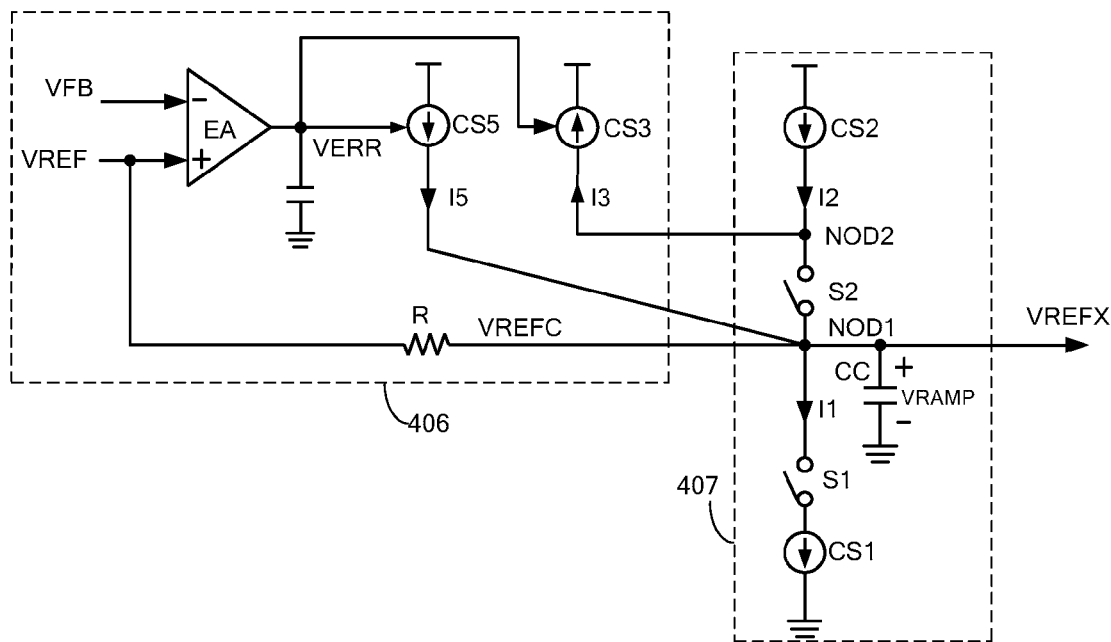
FIG. 4 illustrates an error calibration circuit 406 for eliminating the DC error introduced by the reference compensating circuit 407 in accordance with another embodiment of the present invention.

FIG. 4 illustrates an error calibration circuit 406 for eliminating the DC error introduced by the reference compensating circuit 407 in accordance with another embodiment of the present invention. Compared with the error calibration circuit 106 in FIG. 1, the error calibration circuit 406 in FIG. 4 further comprises a current source CS5. The current source CS5 is coupled to the error amplifier EA to receive the error signal VERR, and to provide a fifth current I5 based on the error signal VERR. The fifth current I5 flows into the compensation node NOD1 continuously, irrelevant to the control of the second switch S2.

The switching converter operates in discontinuous current mode (DCM) at a light load. In such case, for most of the time, the second switch S2 is off and the current sink CS3 stops sinking current from the compensation node NOD1. As the current source CS5 operates irrelevantly to the control of the second switch S2, the DC error introduced by the reference compensating circuit 407 can be eliminated nevertheless, with the fifth current I5 flowing through the resistor R.

Figure 5:
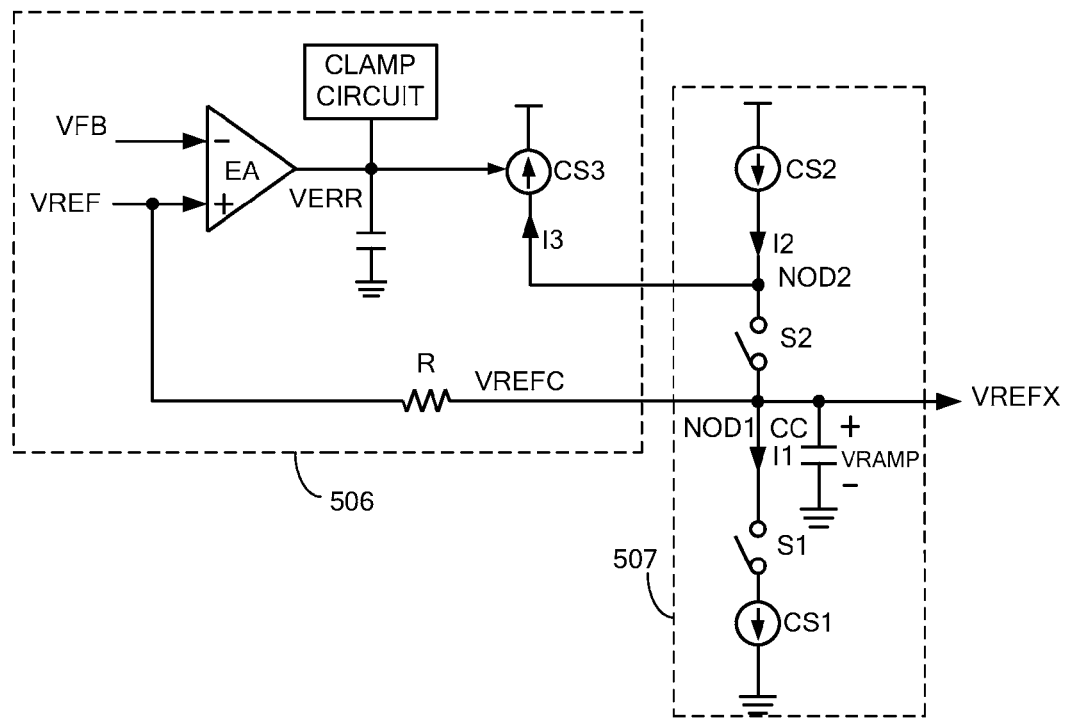
FIG. 5 illustrates an error calibration circuit 506 for eliminating the DC error introduced by the reference compensating circuit 507 in accordance with another embodiment of the present invention.

FIG. 5 illustrates an error calibration circuit 506 for eliminating the DC error introduced by the reference compensating circuit 507 in accordance with another embodiment of the present invention. Compared with the error calibration circuit 106 in FIG. 1, the error calibration circuit 506 in FIG. 5 further comprises a clamp circuit which is coupled to the output terminal of the error amplifier EA. The clamp circuit is configured to clamp the error signal VERR at a fixed value when the error signal VERR is larger than a reference value. Thus, the error signal VERR is clamped at the fixed value when the error signal VERR is relatively large at a heavy load, which may be used to prevent overshoot event. In one embodiment, the clamp circuit may comprise a clamp diode.

It will be appreciated by persons skilled in the art that the present invention is not limited to what has been particularly shown and described herein above. Rather the scope of the present invention is defined by the claims and includes both combinations and sub-combinations of the various features described hereinabove as well as variations and modifications thereof which would occur to persons skilled in the art upon reading the foregoing description and which are not in the prior art.

What is claimed is:

1. A reference compensating circuit used in a COT control circuit, wherein the reference compensating circuit is configured to generate a calibrated compensation reference signal at a compensation node, and wherein based on the calibrated compensation reference signal, the COT control circuit is configured to control a switching converter to convert an input voltage into an output voltage through turning a main switch and a freewheeling component on and off alternately, the reference compensating circuit comprising:
    an error amplifier configured to receive a reference signal and a feedback signal representative of the output voltage, and to generate an error signal based on the feedback signal and the reference signal;
    a first current sink coupled to the compensation node, wherein the first current sink is configured to receive the error signal and to generate a first current based on the error signal, and wherein the first current flows out from the compensation node;
    a resistor having a first terminal coupled to the reference signal, and a second terminal coupled to the compensation node;
    a second current sink coupled to the compensation node to sink a second current from the compensation node when the main switch is turned on;
    a first current source coupled to the compensation node to source a third current into the compensation node; and
    a compensation capacitor coupled between the compensation node and a ground.

2. The reference compensating circuit of claim 1, wherein the reference compensating circuit further comprises a switch having a first terminal and a second terminal, wherein the first terminal is coupled to the first current source and the first current sink, and the second terminal is coupled to the compensation node, and wherein the switch is turned on when either the main switch or the freewheeling component is turned on.

3. The reference compensating circuit of claim 2, wherein the reference compensating circuit further comprises a second current source configured to receive the error signal and to generate a fourth current based on the error signal, and wherein the fourth current is continuously sourced into the compensation node.

4. The reference compensating circuit of claim 1, wherein the reference compensating circuit further comprises a third current source configured to source a fifth current into the compensation node.

5. The reference compensating circuit of claim 4, wherein the fifth current is constant or varies with the output voltage.

6. The reference compensating circuit of claim 1, wherein the reference compensating circuit further comprises a clamp circuit coupled to the error amplifier and configured to clamp the error signal at a fixed value when the error signal is larger than a reference value.

7. The reference compensating circuit of claim 1, wherein the reference compensating circuit further comprises a buffer circuit configured to receive the reference signal, and to generate a buffer signal based on the reference signal, and wherein the buffer signal is provided to the first terminal of the resistor.

8. The reference compensating circuit of claim 1, wherein the reference compensating circuit further comprises a compensation network coupled to the error amplifier to compensate the error signal.

9. The reference compensating circuit of claim 1, wherein the second current is proportional to the input voltage and the third current is proportional to the output voltage.

10. The reference compensating circuit of claim 1, wherein the COT control circuit comprises:
    an on-time generation circuit configured to generate an on-time signal;
    a comparison circuit configured to compare the calibrated compensation reference signal with the feedback signal, and to generate a comparison signal; and
    a logic circuit configured to receive the on-time signal and the comparison signal, and to control the main switch and the freewheeling component based on the on-time signal and the comparison signal.

11. A COT control circuit configured to control a switching converter to convert an input voltage into an output voltage through turning a main switch and a freewheeling component on and off alternately, wherein the control circuit comprising:
- a reference compensating circuit configured to generate a calibrated compensation reference signal at a compensation node, wherein the reference compensating circuit comprises:
  - an error amplifier configured to receive a reference signal and a feedback signal representative of the output voltage, and to generate an error signal based on the feedback signal and the reference signal;
  - a first current sink coupled to the compensation node, wherein the first current sink is configured to receive the error signal and to generate a first current based on the error signal, and wherein the first current flows out from the compensation node;
  - a resistor having a first terminal coupled to the reference signal, and a second terminal coupled to the compensation node;
  - a second current sink coupled to the compensation node to sink a second current from the compensation node when the main switch is turned on;
  - a first current source coupled to the compensation node to source a third current into the compensation node; and
  - a compensation capacitor coupled between the compensation node and a ground;
- an on-time generation circuit configured to generate an on-time signal;
- a comparison circuit configured to compare the calibrated compensation reference signal with the feedback signal and to generate a comparison signal; and
- a logic circuit configured to receive the on-time signal and the comparison signal, and to control the main switch and the freewheeling component based on the on-time signal and the comparison signal.

12. The COT control circuit of claim 11, wherein the reference compensating circuit further comprises a switch having a first terminal and a second terminal, wherein the first terminal is coupled to the first current source and the first current sink, and the second terminal is coupled to the compensation node, and wherein the switch is turned on when either the main switch or the freewheeling component is turned on.

13. The COT control circuit of claim 12, wherein the reference compensating circuit further comprises a second current source configured to receive the error signal and to generate a fourth current based on the error signal, and wherein the fourth current is continuously sourced into the compensation node.

14. The COT control circuit of claim 11, wherein the reference compensating circuit further comprises a third current source configured to source a fifth current into the compensation node.

15. The COT control circuit of claim 11, wherein the reference compensating circuit further comprises a buffer circuit configured to receive the reference signal, and to generate a buffer signal based on the reference signal, and wherein the buffer signal is provided to the first terminal of the resistor.

16. The control circuit of claim 11, wherein the second current is proportional to the input voltage and the third current is proportional to the output voltage.

17. A switching converter, comprising:
- a switching circuit configured to convert an input voltage into an output voltage by turning a main switch and a freewheeling component on and off alternately;
- an on-time generation circuit configured to generate an on-time signal;
- a reference compensating circuit configured to generate a calibrated compensation reference signal at a compensation node, wherein the reference compensating circuit comprises:
  - an error amplifier configured to receive a reference signal and a feedback signal representative of the output voltage, and to generate an error signal based on the feedback signal and the reference signal;
  - a first current sink coupled to the compensation node, wherein the first current sink is configured to receive the error signal and to generate a first current based on the error signal, and wherein the first current flows out from the compensation node;
  - a resistor having a first terminal coupled to the reference signal, and a second terminal coupled to the compensation node;
  - a second current sink coupled to the compensation node to sink a second current from the compensation node when the main switch is turned on;
  - a first current source coupled to the compensation node to source a third current into the compensation node; and
  - a compensation capacitor coupled between the compensation node and a ground;
- a comparison circuit configured to compare the calibrated compensation reference signal with the feedback signal and to generate a comparison signal; and
- a logic circuit configured to receive the on-time signal and the comparison signal, and to control the main switch and the freewheeling component based on the on-time signal and the comparison signal.

18. The switching converter of claim 17, wherein the reference compensating circuit further comprises a switch coupled between the first current source and the compensation node, and wherein the switch is turned on when either the main switch or the freewheeling component is turned on.

19. The switching converter of claim 17, wherein the reference compensating circuit further comprises a second current source configured to receive the error signal and to generate a fourth current based on the error signal, and wherein the fourth current is continuously sourced into the compensation node.

20. The switching converter of claim 17, wherein the reference compensating circuit further comprises a third current source configured to source a fifth current into the compensation node.

* * * * *